(12) United States Patent
Owen et al.

(10) Patent No.: US 8,865,031 B2
(45) Date of Patent: Oct. 21, 2014

(54) METHOD AND APPARATUS FOR APPLYING A MID-IR GRADED-INDEX MICROSTRUCTURE TO AN OPTICAL FIBER TIP TO ACHIEVE ANTI-REFLECTIVE PROPERTIES

(75) Inventors: Joseph M. Owen, Derry, NH (US); David P. Kelly, Nashua, NH (US); Michael E. Chadwick, Bedford, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 767 days.

(21) Appl. No.: 13/094,860

(22) Filed: Apr. 27, 2011

(65) Prior Publication Data

US 2011/0262876 A1 Oct. 27, 2011

Related U.S. Application Data

(60) Provisional application No. 61/328,288, filed on Apr. 27, 2010.

(51) Int. Cl.
| | |
|---|---|
| *B29D 11/00* | (2006.01) |
| *G02B 6/10* | (2006.01) |
| *G02B 6/02* | (2006.01) |
| *G02B 6/42* | (2006.01) |
| *G02B 6/26* | (2006.01) |

(52) U.S. Cl.
CPC .......... *G02B 6/02052* (2013.01); *G02B 6/4207* (2013.01); *G02B 6/102* (2013.01); *G02B 6/262* (2013.01)
USPC ....... 264/1.21; 264/1.24; 264/1.25; 264/1.26; 264/1.28; 264/1.31; 264/1.32; 264/1.6; 264/1.7; 264/1.8; 264/1.9; 264/2.7; 264/627; 264/639; 264/640; 264/641; 264/441

(58) Field of Classification Search
USPC ........... 264/1.21, 1.24, 1.25, 1.26, 1.28, 1.31, 264/1.32, 1.6, 1.7, 1.8, 1.9, 2.7, 627, 639, 264/640, 441
See application file for complete search history.

(56) References Cited

U.S. PATENT DOCUMENTS 6,208,781 B1 * 3/2001 Neuberger et al. ............. 385/31
2001/0045108 A1 * 11/2001 Steinberg et al. ............... 65/378

\* cited by examiner

*Primary Examiner* — Jeffrey Wollschlager
*Assistant Examiner* — Stella Yi
(74) *Attorney, Agent, or Firm* — Daniel J. Long

(57) ABSTRACT

A method and apparatus for applying a mid-IR graded microstructure to the end of an As2S3 optical fiber are presented herein. The method and apparatus transfer a microstructure from a negative imprint on a nickel shim to an As2S3 fiber tip with minimal shape distortion and minimal damage-threshold impact resulting in large gains in anti-reflective properties.

15 Claims, 3 Drawing Sheets

METHOD AND APPARATUS FOR APPLYING A MID-IR GRADED-INDEX MICROSTRUCTURE TO AN OPTICAL FIBER TIP TO ACHIEVE ANTI-REFLECTIVE PROPERTIES

CROSS REFERENCE TO RELATED APPLICATIONS

This Application claims the benefit of the filing date of U.S. Provisional Application No. 61/328,288 filed on Apr. 27, 2010, the entire contents of which are incorporated by reference hereto.

STATEMENT OF GOVERNMENT INTEREST

The claimed subject matter was reduced to practice with United States Government support under Contract No. N00173-05-C-6020 awarded by the United States Naval Research Laboratory. Accordingly, the United States Government has certain rights in the claimed subject matter.

BACKGROUND OF THE INVENTION

1. Field of the Invention

The disclosed subject matter relates to a method and apparatus for transferring a microstructure from a negative imprint on a nickel shim to an As2S3 optical fiber tip with minimal shape distortion and minimal damage-threshold impacts, thereby improving the anti-reflective properties of the As2S3 optical fiber.

However, the method and apparatus herein presented are not limited in application to As2S3 optical fibers. In fact, the apparatus and method herein presented can be practiced with other optical fiber materials having melting points below 600° C.

2. Brief Description of Related Art

Optical fibers can be used in a great number of applications in the Mid-IR wavelength region including sensing, imaging and processing. These optical fibers have large refractive indexes, ranging from about 2.3 to about 2.9. Air, on the other hand, has a refractive index of 1. This large difference in refractive index between the optical fibers and air leads to signal losses at the optical fiber/air interface. In some, applications these signal losses at the optical fiber/air interface can amount to 25% or more.

In order to prevent signal losses, some have turned to applying anti-reflective coatings to polished fiber tips. However, polishing can oftentimes lead to optical fiber fracture in delicate fiber materials. Furthermore, anti-reflective coatings often exhibit adhesion problems and rapid degradation as a result of exposure to high intensity signal radiation.

SUMMARY OF THE INVENTION

Therefore, a need exists for an improved method and apparatus for applying an anti-reflective treatment to mid-IR optical fibers that is reliable, efficient and does not damage the optical fibers.

In one embodiment, the disclosed subject matter relates to a method for preventing reflection losses in optical fibers, the method comprising the steps of heating an optical fiber tip to form a heated optical fiber tip, flattening the heated optical fiber tip to form a flattened optical fiber tip, heating the flattened optical fiber tip and imprinting a microstructure onto the flattened optical fiber tip.

In another embodiment, the disclosed subject matter relates to method for preventing reflection losses in properly terminated As2S3 fibers, the method comprising securing a properly terminated As2S3 fiber into a ferrule, so that a tip of the properly terminated As2S3 fiber protrudes about 1 mm to 2 mm from the ferrule, fastening the ferrule to a fixture, lowering the fixture onto a heating surface, such that the heating surface transfers heat to the properly terminated As2S3 fiber tip without touching the properly terminated As2S3 fiber tip, adjusting the orientation of the fixture with a hollow cylinder placed between the fixture and the heating surface to ensure perpendicularity of the properly terminated As2S3 fiber tip relative to the heating surface, lowering the fixture so that the properly terminated As2S3 fiber tip contacts the heating surface, replacing the heating surface with a hot imprinting surface, lowering the fixture onto the hot imprinting surface, such that the hot imprinting surface transfers heat to the properly terminated As2S3 fiber tip without touching the properly terminated As2S3 fiber tip and lowering the fixture so that the properly terminated As2S3 fiber tip contacts the hot imprinting surface.

In another embodiment the disclosed subject matter relates to an apparatus for creating an antireflective tip in an optical fiber, the apparatus comprising a fixture that is primarily capable of translational motion, with tip/tilt rotational fine-adjustment via goniometer or similar device, a heating element positioned along a translational axis of the fixture and a shaping member disposed on the heating element.

BRIEF DESCRIPTION OF THE DRAWINGS

Embodiments will be better understood from the detailed description given below and by reference to the attached drawings in which.

DETAILED DESCRIPTION OF THE INVENTION

As used herein the term "properly terminated fiber," or "appropriately terminated optical fiber," or "properly terminated As2S3 fiber" means an optical fiber, including an As2S3 fiber and any other optical fiber having a melting point below 600° C., that has been previously cleaved and glued into a Zirconia Ferrule, such that the optical fiber tip protrudes out about one to two diameters.

Figure 1A:
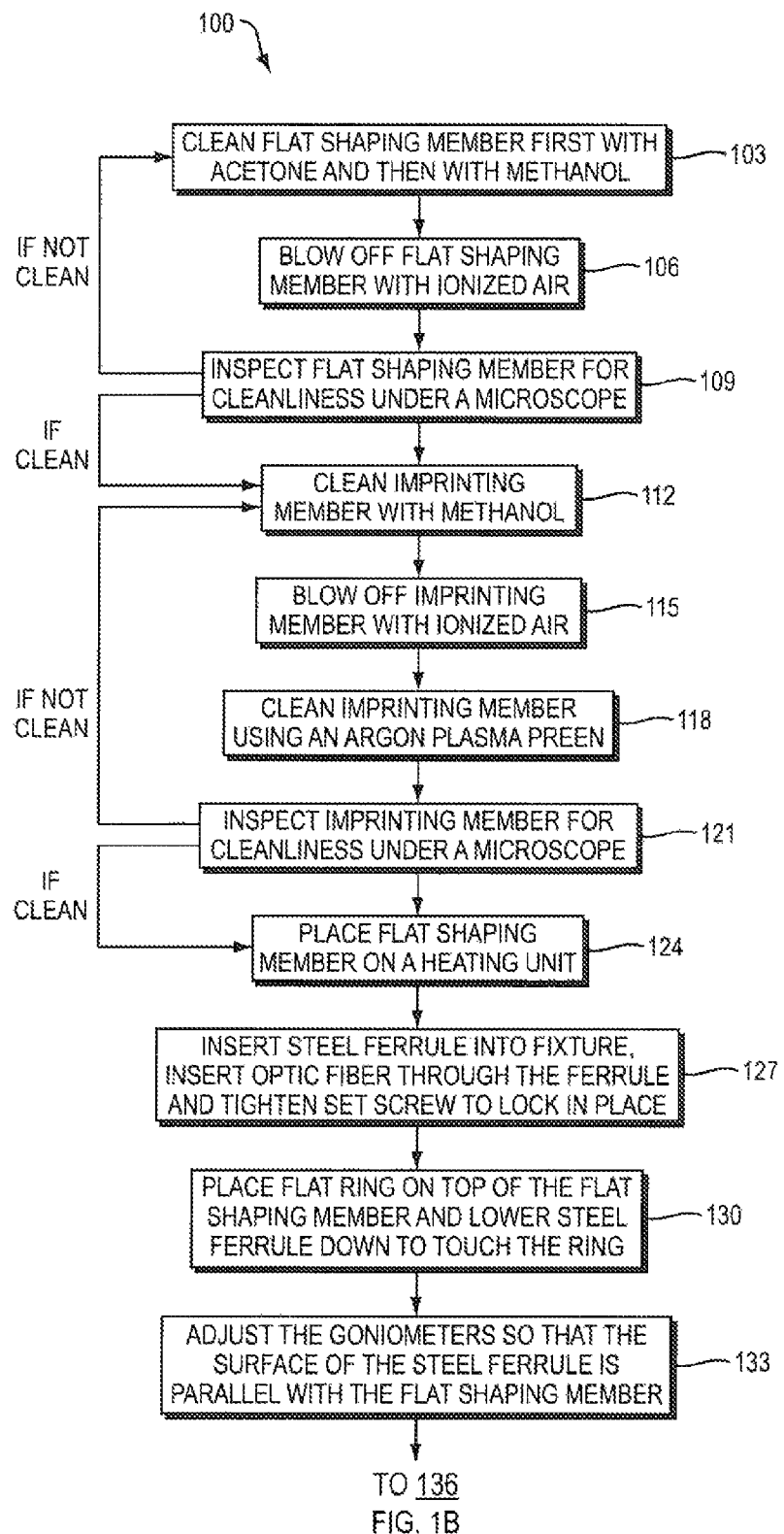
FIG. 1A is a flowchart depicting an embodiment of the method for preventing reflection losses in optical fibers.

Referring to FIG. 1A, a preferred embodiment of the claimed method is depicted in flow chart 100. In step 103, using standard optic practices, a flat shaping member is cleaned, first using acetone and subsequently using methanol. In step 106, ionized air is applied to the flat shaping member in order to remove any excess acetone and/or methanol left over from step 103. In step 109, a flat shaping member is inspected for cleanliness under a high power, long focal length digital microscope, having at least 80× magnification capabilities.

In order to ensure proper cleanliness during this stage of the process, if microscopic inspection in step 109 reveals that further cleaning is necessary, the cleaning procedure should be repeated beginning with step 103, until microscopic inspection in step 109 reveals that the flat shaping member is clean.

In step 112, using standard optic cleaning practices, an imprinting member is cleaned using methanol. In step 115, ionized air is applied to the imprinting member in order to remove any excess methanol left over from step 112. The imprinting member is then cleaned using an Argon Plasma Cleaner (such as "Plasma Preen" made by Terra Universal, Inc) (step 118), and inspected for cleanliness (step 121) under a high power, long focal length digital microscope, having at least 80× magnification capabilities.

In order to ensure proper cleanliness during this stage of the process, if microscopic inspection in step 121 reveals that further cleaning is necessary, the cleaning procedure should be repeated beginning with step 112, until microscopic inspection in step 121 reveals that the flat shaping member is clean.

In step 124, the flat shaping member is placed on a temperature adjustable heating unit, such as a hot plate. While the shaping member is heating up (in step 124), in step 127 a properly terminated As2S3 fiber is inserted into a fastening fixture, usually made of steel. The As2S3 fiber ferrule is inserted into the fixture such that the Zirconia-clad tip protrudes about 1 mm to about 2 mm from the end of the fastening fixture. The fastening fixture holds the Zirconia ferrule parallel to the primary axis of translation and features a larger perpendicular surface which can be used as a reference surface in the next step (the hollow cylinder adjustment). The fixture is capable of translational motion, so that as the fixture moves down, the fixture moves toward the shaping member positioned directly below the fixture and as the fixture moves up, the fixture moves away from the shaping member positioned directly below the fixture.

Once the ferrule and optic fiber are fastened in the fixture (step 127), in step 130, a hollow cylinder with flat, parallel ends is placed on top of the flat shaping member and the fixture is lowered so as to touch the opposite end of the cylinder. The tip/tilt adjustment feature is used (step 133) to make sure the fixture is flush with the cylinder end (adjusted by eye). This ensures that the ferrule/optic fiber assembly's translational axis is normal to the surface of the shaping member. Further, because the cylinder is hollow, only the outer surface of the fixture contacts the ring, while the optic fiber tip remains untouched within the hollow space.

In step 133, goniometers are adjusted to ensure that the ferrule/optic fiber assembly is normal (along the axis of translational motion) to the top surface of the shaping member. Thus once the ring is removed the bottom surface of the ferrule and the optic fiber tip contained within it are nominally parallel to the flat shaping member (to within the tolerances of the assemblies).

Figure 1B:
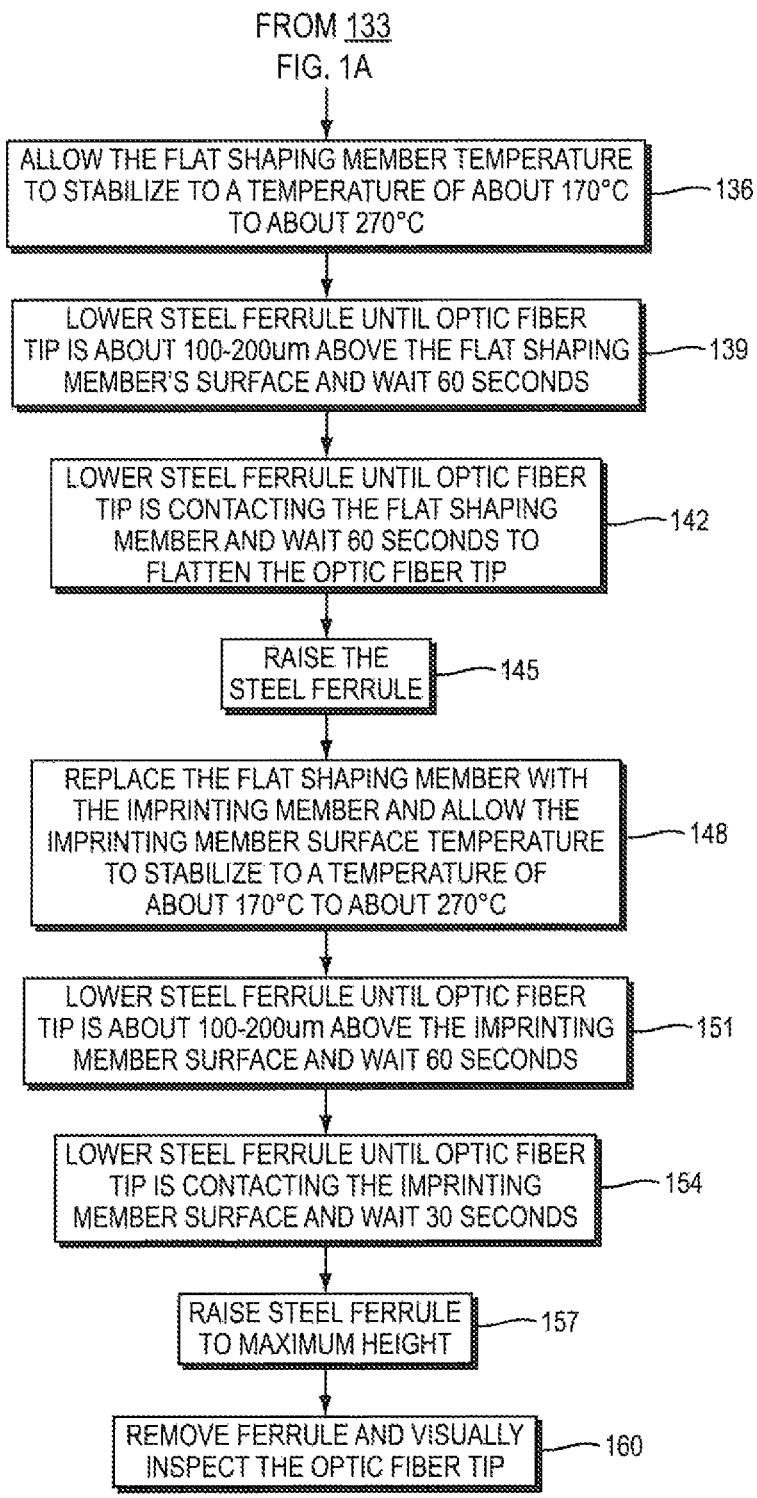
FIG. 1B is a flowchart depicting an embodiment of the method for preventing reflection losses in optical fibers.

Referring to FIG. 1B, in step 136, the temperature of the flat shaping member is allowed to stabilize with the temperature of a hot plate surface, to a temperature range of about 170° C. to about 270° C. It is important to ensure the flattening member stabilizes within the above-mentioned temperature range because a lower temperature may result in defective flattening, while a higher temperature could result in optic fiber damage.

Once the flattening member has stabilized at the desired temperature (step 136), in step 139 the fixture is lowered bringing the ferrule/optic fiber assembly toward the heated flattening member. Since the optic fiber tip protrudes from the ferrule, as the fixture moves toward the heated flattening member, the optic fiber tip is closer to the heated flattening member than any portion of the ferrule. The fixture should move down toward the heated flat shaping member until the optic fiber tip is about 100 μm to about 200 μm from the heated flat shaping member. Once the optic fiber tip is within this desired range, the fixture is held in place for about 60 seconds. This permits the tip to be heated radiatively and by air convection due to its close proximity to the heated surface.

At the end of the 60 seconds of step 139, the fixture again moves down toward the heated flat shaping member until the optic fiber tip contacts the heated surface of the flat shaping member (step 142). To ensure appropriate flattening of the optic fiber tip, in step 142 a prescribed pressure of about 3,000 PSI to about 144,000 PSI is applied on the optic fiber tip against the flat surface of the heated flat shaping member. The period of time during which contact and pressure are applied can vary. In fact, contact and pressure can be maintained for a period of about 10 seconds to about 300 seconds (Note: time, temperature and pressure are co-dependent variables—reducing one quantity can often be made up by increasing another).

In step 145, the pressure on the optic fiber tip is removed and the fixture is moved, away from the heated surface of the flat shaping member. The optic fiber tip at the end of step 145 should be flat, consistent with the surface of the heated flat shaping member.

In step 148, the flat shaping member is removed from hot plate and replaced with the imprinting member. The imprinting member is allowed to stabilize to a temperature range of about 170° C. to about 270° C. The surface of the imprinting member closest to the optic fiber tip contains a negative imprint of the microstructure that will later be contact transferred to the optic fiber tip on step 154 below. The microstructure on the imprinting member can consists of any desired pattern arrangement, but usually contains a plurality of protrusions and recesses. In one embodiment, the microstructure used is manufactured by TelAztec LLC of Burlington Mass. 01803.

Once the imprinting member's temperature is stabilized (step 148), in step 151 the fixture is lowered bringing the ferrule/optic fiber assembly toward the heated imprinting member. The fixture should move down toward the heated imprinting member until the optic fiber tip is about 100 μm to about 200 μm from the heated imprinting member. Once the optic fiber tip is within this desired range, the fixture is held in place for about 60 seconds. This permits the tip to be heated radiatively and by air convection due to its close proximity to the heated surface.

At the end of the 60 seconds of step 151, the fixture again moves toward the heated imprinting member until the optic fiber tip contacts the heated imprinting member (step 154). To ensure appropriate imprinting of the optic fiber tip, a prescribed pressure of about 3,000 PSI to about 80,000 PSI is be applied on the optic fiber tip against the surface of the imprinting member. Contact and pressure should be maintained for a period of about 30 seconds. The period of time during which contact and pressure are applied can vary. In fact, contact and pressure can be maintained for a period of about 10 seconds to about 300 seconds (Note: time, temperature and pressure are co-dependent variables—reducing one quantity can often be made up by increasing another).

At the end of the 30 second period, in step 157 the pressure is removed and the fixture is moved away from the imprinting member. The optic fiber tip at the end of step 157 should have a microstructure, consistent with the surface of the imprinting member.

In step 160, the ferrule/optic fiber assembly is removed from the fixture and is inspected under appropriate magnification to ensure proper microstructure transfer.

Figure 2:
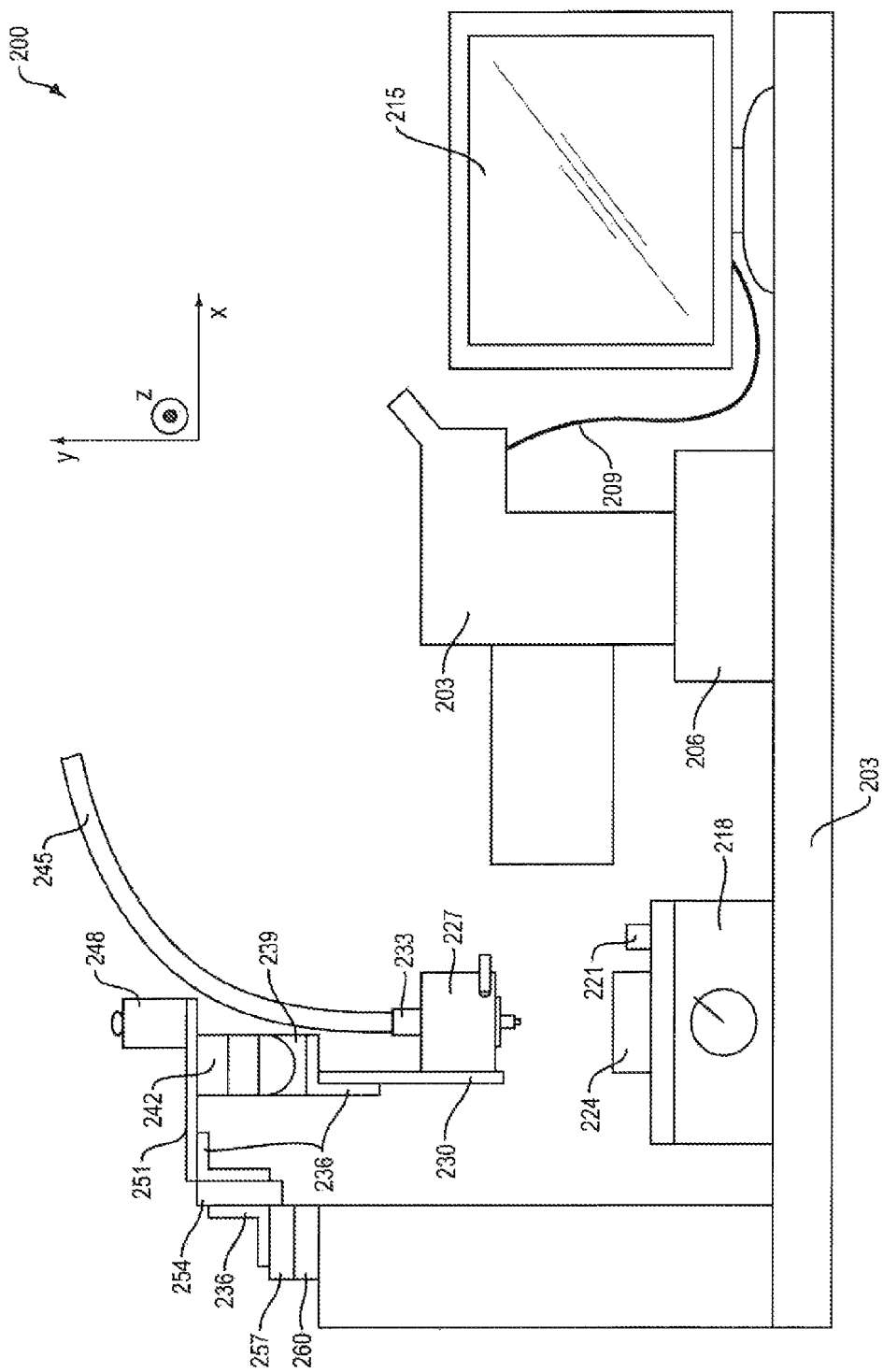
FIG. 2 is a schematical view an embodiment of the apparatus for creating an antireflective tip in an optical fiber.

Referring to FIG. 2, a preferred embodiment of the apparatus for creating an antireflective tip in an optical fiber 200 (hereinafter "the apparatus") is depicted. The apparatus 200 has a fixture 227 that is capable of rotational motion. In one embodiment the fixture 227 is capable of rotational motion along a y-axis that is perpendicular to a work bench 203. However, in other embodiments the fixture 227 may be capable of translational motion along the x-axis or z-axis.

The apparatus 200 also has a heating element 218 that is positioned along the axis of translational motion of the fixture 227. The heating element 218 has a temperature sensing means 221 disposed on it. The temperature sensing means 221 can consist of a thermistor, a thermometer or any other temperature sensing device commercially available.

The axis of translational motion of the fixture 227 can vary. For instance, in one embodiment, where the axis of translational motion corresponds to an axis of gravitational acceleration, in this embodiment the heating element 218 can be positioned below the fixture 227, which is disposed on a work bench 203. In an alternate embodiment, the heating element 218 can be position above the fixture 227. Further, in other embodiments the axis of translational motion of the fixture 227 can be perpendicular to the axis of gravitational acceleration, in this embodiment the heating element 218 can be positioned at any number of positions along the axis of translational motion of the fixture 227. The heating element 218 can be any commercially available hot plate having either variable temperature of variable power settings.

Positioned on the heating element 218, there is a shaping member 224. The shaping member 224 is positioned so that at least a portion of the shaping member 224 intersects the axis of translational motion of the fixture 227. The shaping member 224 can have different patterns. For instance, in one embodiment the shaping member 224 has a substantially flat shape. In an alternate embodiment, the shaping member 224 can have a negative imprinting region having an irregular shape consisting of a plurality of protrusions and recessions.

Further, the shaping member 224 can have either single shaping pattern or a multiple shaping patterns. For instance, in one embodiment the shaping member 224 can have a single substantially flat shaping pattern. In a different embodiment, the shaping member 224 can have a single negative imprinting region consisting of an irregular shape pattern having a plurality of protrusions and recessions. In other embodiments, the shaping member 224 can have combinations of patterns located on different regions of the shaping member 224. For instance in one embodiment the shaping member 224 can have a first region that is substantially flat and a second region that is substantially irregular.

Fastened to the fixture 227, there is a ferrule 233. The ferrule 233 can be any type of commercially available and appropriate ferrule, including steel ferrules as long as the process of inserting the fiber into the ferrule 233 does not damage it. The bare optical fiber 245 is glued into the ferrule 233 in advance. The bare optical fiber 245 and ferrule 233 assembly can have additional secondary ferrules, fixture adapters or armor surrounding the ferrule-terminated fiber such that the assembly fits snugly into the fixture 227. In a preferred embodiment, the bare optical fiber 245 is an As2S3 fiber. Further, the bare optical fiber 245 is terminated with a Zirconia ferrule nested inside a steel adapter placed in the ferrule 233, so that at least of a portion of the bare optical fiber 245 (a fiber tip) protrudes through the ferrule 233 assembly.

Upon fastening to the fixture 227 the ferrule 233 and bare optical fiber 245 moves along the translational axis of motion of the fixture 227, either toward or away from the shaping member 224. Guiding the translational motion there can be a rail 230 that is operatively connected to the fixture 227, so that the fixture 227 can move along the rail 230. A connecting member 236 can be used to connect the rail 230 to z-axis goniometer 239 and x-axis goniometer 242, which allow for two-dimensional rotational adjustments of the fixture 227 along the z-axis and x-axis, respectively. In general, the goniometers' 239 242 axes are set up perpendicular to one-another as well as perpendicular to the primary axis of translation (y-axis in this example).

In one embodiment, there can be platform 251 connected to the x-axis goniometer 242 and also operatively connected via a connecting member 236 to translational stage 254, thereby providing translational motion to the fixture 227. In an alternate embodiment, the platform 251 can be connected to the z-axis goniometer 239 and also be operatively connected via a connecting member 236 to translational stage 254. Translational stage 254 provides translational motion to the fixture 227 along any desired axis depending on the desired set up. For instance in one embodiment, translational stage 254 may provide translational motion along an axis normal (i.e. along a y-axis) to a work bench 203. In other embodiments, the translational stage 254 may provide translational motion along an axis parallel (i.e. along an x-axis) to a work bench 203.

Additional translational members may be provided in order to facilitate two or three dimensional adjustment capabilities. For instance, in one embodiment a z-axis translational stage 257 can be operatively connected to translational stage 254 to provide overall control of both y-axis and z-axis motion, respectively. Further, an x-axis translational stage 260 can be operatively connected to z-axis translational stage 254 to provide overall control of y-axis, z-axis and x-axis, respectively.

The apparatus 200 also has a pressure exerting member 248. The pressure exerting member 248 exerts pressure along the translational axis of rotation of the fixture 227, and more particularly along the length of the bare optical fiber 245. In one embodiment the pressure exerting member 248 can be a weight. In this embodiment, the weight can be disposed on platform 251, where it transfers pressure to the fixture 227 by gravity. In other embodiments, the pressure exerting member 248 can be a hydraulic device, mechanical screw, or other pressure exerting device operatively connected to the fixture 227. The pressure exerting member 248 is capable of exerting a pressure in the range of about 3,000 PSI to about 144,000 PSI. In the case where weights are used, the applied pressure is inferred by dividing the weight by the bare optical fiber 245 surface area. In other embodiments, a scale or force-feedback sensor can be used to measure the applied force for pressure calculations.

A microscope 209 can be positioned within line of sight of the fixture 227 in order to facilitate visual inspection of the bare optical fiber 245 while the apparatus 200 is in use. In one embodiment, the microscope 209 has a long focal length and has at least 80× magnification capabilities along with electronic video capabilities. The microscope can be positioned on a microscope stand 206 and can be optionally connected via a video-signal cable 212 to a monitor 215 that displays the images captured by the microscope 209, thereby facilitation inspection of the bare optical fiber 245.

It is to be understood, that the above-described arrangements are intended solely to illustrate the application of the principles of the disclosed subject matter. Numerous modifications and alternative arrangements may be devised by those skilled in the art without departing from the spirit and scope of the disclosed subject matter in the present Application. Accordingly, the appended claims are intended to cover such modifications and alternative arrangements. Thus, while the disclosed subject matter of the present Application has been described above with particularity and detail in connection with what is presently deemed to be the most practical and preferred embodiments, it will be apparent to those skilled in the art that numerous modifications, including, but not limited to, variations in size, materials, shape, form, function and manner of operation, assembly and use may be made without departing from the principles and concepts set forth herein.

What is claimed is:

1. A method for preventing reflection losses in optical fibers, the method comprising:
   heating an appropriately terminated As2S3 optical fiber tip to form a heated optical fiber tip;
   flattening the heated optical fiber tip to form a flattened optical fiber tip;
   heating the flattened optical fiber tip; and
   imprinting a microstructure onto the flattened optical fiber tip.

2. The method of claim 1, further comprising applying pressure to the heated As2S3 fiber tip against a substantially flat surface.

3. The method of claim 1, further comprising applying pressure to the flattened As2S3 fiber tip against a negative imprinting surface.

4. The method of claim 2, further comprising causing the pressure applied to the heated As2S3 fiber tip to be in the range of about 3,000 PSI to about 80,000 PSI.

5. The method of claim 3, further comprising causing the pressure applied to the flattened As2S3 fiber tip to be in the range of about 3,000 PSI to about 80,000 PSI.

6. The method of claim 2, further comprising causing the heated As2S3 fiber tip to be heated to a range of about 170° C. to about 270° C.

7. The method of claim 2, further comprising causing the flattened As2S3 fiber tip to be heated to a range of about 170° C. to about 270° C.

8. The method of claim 3, further comprising causing the imprinting surface to have a plurality of protrusions and recesses.

9. A method for preventing reflection losses in properly terminated As2S3 fibers, the method comprising:
   securing a properly terminated As2S3 fiber into a ferrule, so that a tip of the properly terminated As2S3 fiber protrudes about 1 mm to 2 mm from the ferrule;
   fastening the ferrule to a fixture;
   lowering the fixture onto a heating surface, such that the heating surface transfers heat to the properly terminated As2S3 fiber tip without touching the properly terminated As2S3 fiber tip;
   adjusting the orientation of the fixture with a hollow cylinder placed between the fixture and the heating surface to ensure perpendicularity of the properly terminated As2S3 fiber tip relative to the heating surface;
   lowering the fixture so that the properly terminated As2S3 fiber tip contacts the heating surface;
   replacing the heating surface with a hot imprinting surface;
   lowering the fixture onto the hot imprinting surface, such that the hot imprinting surface transfers heat to the properly terminated As2S3 fiber tip without touching the properly terminated As2S3 fiber tip; and
   lowering the fixture so that the properly terminated As2S3 fiber tip contacts the hot imprinting surface.

10. The method of claim 9, further comprising applying a pressure of about 3,000 PSI to about 144,000 PSI to the properly terminated As2S3 fiber tip against the heating surface.

11. The method of claim 10, further comprising applying a pressure of about 3,000 PSI to about 144,000 PSI to the properly terminated As2S3 fiber tip against the hot imprinting surface.

12. The method of claim 11, further comprising removing the properly terminated As2S3 fiber tip from heating surface after a contact period of about 10 seconds to about 300 seconds.

13. The method of claim 11, further comprising removing properly terminated As2S3 fiber tip from the hot imprinting surface after a contact period of about 10 seconds to about 300 seconds.

14. The method of claim 11, wherein the step of lowering the fixture onto a heating surface includes lowering the properly terminated As2S3 fiber tip to within about 100 µm to about 200 µm of the heating surface.

15. The method of claim 11, wherein the step of lowering the fixture onto the hot imprinting surface includes lowering the properly terminated As2S3 fiber tip to within about 100 µm to about 200 µm of the hot imprinting surface.

* * * * *